United States Patent [19]
Kalinoski et al.

[11] 4,195,517
[45] Apr. 1, 1980

[54] ULTRASONIC FLOWMETER

[75] Inventors: Richard W. Kalinoski, East Providence, R.I.; James H. Vignos, Needham Heights, Mass.

[73] Assignee: The Foxboro Company, Foxboro, Mass.

[21] Appl. No.: 970,675

[22] Filed: Dec. 18, 1978

[51] Int. Cl.² .............................................. G01F 1/66
[52] U.S. Cl. ................................................. 73/194 A
[58] Field of Search .................... 73/194 A, 597, 598, 73/644, 290 V

[56] References Cited

U.S. PATENT DOCUMENTS

| | | | |
|---|---|---|---|
| 3,184,969 | 5/1965 | Bolton | 73/290 V |
| 3,575,050 | 4/1971 | Lynnworth | 73/194 A |
| 3,738,169 | 6/1973 | Courty | 73/194 A |
| 3,869,915 | 3/1975 | Baumoel | 73/194 A |
| 3,906,791 | 9/1975 | Lynnworth | 73/194 A |
| 4,015,470 | 4/1977 | Morrison | 73/194 A |
| 4,130,018 | 12/1978 | Adams et al. | 73/290 V |

OTHER PUBLICATIONS

L. C. Lynnworth—"Clamp—on—Ultrasonic Flowmeters"—*Instrumentation Technology*, Sep. 1975, pp. 37-44.

*Primary Examiner*—Charles A. Ruehl
*Attorney, Agent, or Firm*—Andrew T. Karnakis

[57] ABSTRACT

An ultrasonic flowmeter of the upstream/downstream sonic propagation type includes two transducers mounted externally on the same side of a flow conduit. The transducers are coupled to respective sonic probes which transmit and receive acoustic pulses between the transducers through the fluid by "bouncing" the pulses off the opposite pipe wall. Additionally the meter maintains a smooth bore in the measurement region so that the acoustic pulses are refracted at the probe/fluid interface and hence propagate along a sonic path that varies depending on the sonic velocities within the fluid and the probe. An acoustic path of known length is included within at least one of the probes along which a portion of the generated acoustic pulses propagates, thereby providing for a third sonic measurement which represents the transmit time in the probe. The three sonic propagation time measurements are necessary and sufficient to specify the flow velocity independent of sound velocity changes in the fluid and the probe and hence of changes in the path of propagation.

33 Claims, 9 Drawing Figures

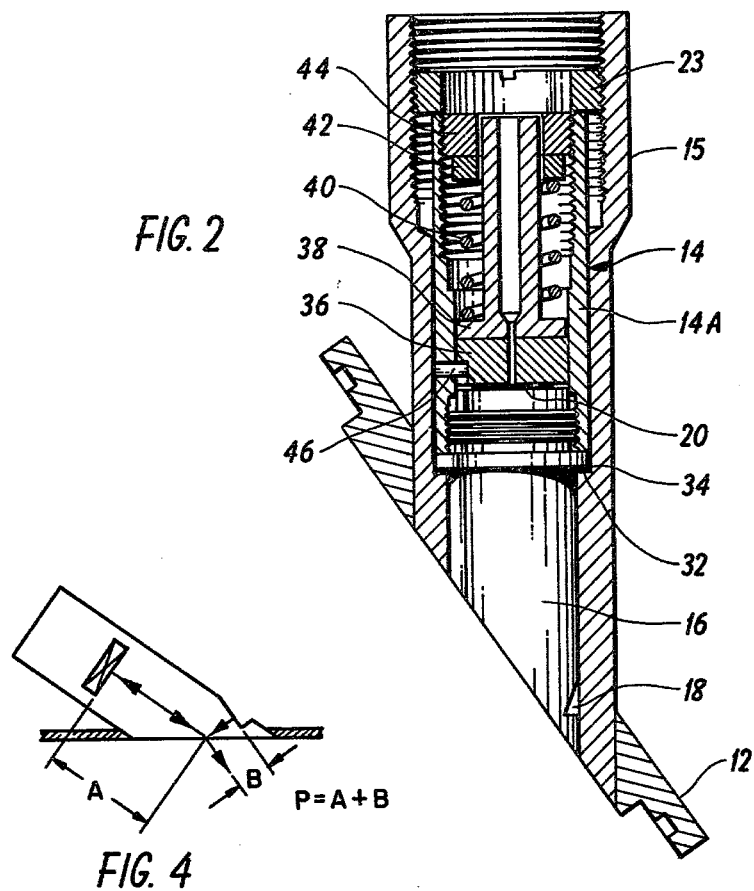
FIG. 2
FIG. 4
$P = A + B$
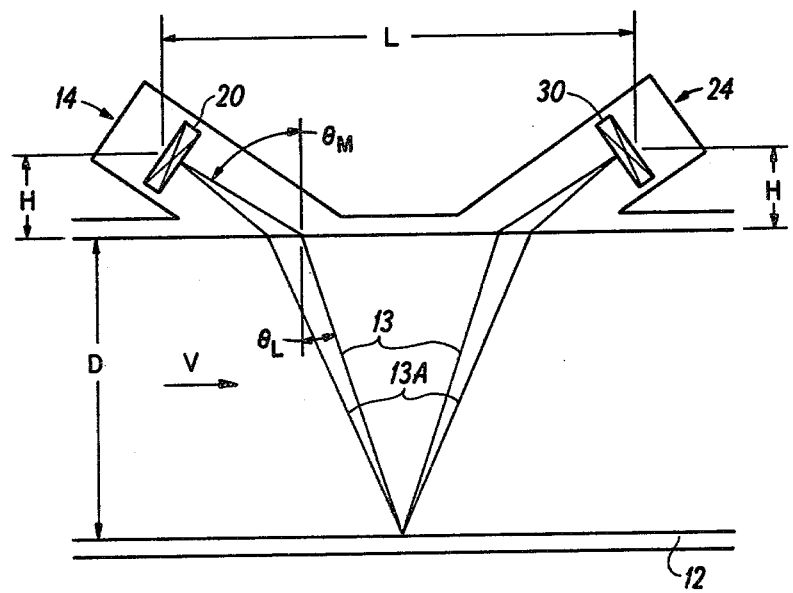
FIG. 3

ULTRASONIC FLOWMETER

FIELD OF THE INVENTION

This invention relates generally to fluid flowmeters and more particularly to such flowmeters employing ultrasonic means to produce an output signal proportional to the velocity of the flowing fluid.

BACKGROUND OF THE INVENTION

In the field of fluid flow measurement, numerous techniques employing ultrasonic means have been devised in the prior art. The number of patent disclosures in this particular field is great. Generally these ultrasonic flowmeters have been of the sonic propagation type in which the speed of sound along a diagonal line intersecting the longitudinal axis of the flowing fluid is measured both with and against the stream of flowing fluid. The difference in these propagation times provides an indication of the velocity of the flow fluid.

Certain of these flowmeters are of the normal injection type, i.e., the sound waves pass through the interface between the flowing fluid and the ultrasonic transducer at right angles to that interface. The disadvantage of such a meter configuration is that in order to maintain the required non-normal angle between the longitudinal axis of the flowing fluid and the sonic velocity vector, the ultrasonic transducer must be mounted on the pipe in such a manner as to produce either pockets or protrusions with respect to the inner walls of the pipe. Such designs thus disrupt the local flow velocity profile in the regions where the measurements are to be made. Additionally they provide a collection point for solids and other waste matter moving through the fluid.

Other ultrasonic flowmeters have employed oblique or wedge injection techniques for introducing the sonic pulse into the fluid to eliminate the need for pockets and/or protrusions. However, since in these systems the sound wave is refracted at the fluid interface in accordance with Snell's Law, variations in the velocity of sound both in the liquid and the sonic transducer will alter the angle of refraction and hence adversely effect the accuracy of the output measurement unless accounted for. For example, the ultrasonic flowmeter disclosed in U.S. Pat. No. 3,575,050 measures the difference in the sonic transit times between upstream and downstream electroacoustical transducers which are arranged to provide for oblique incidence of sound waves at the pipe/fluid interface. However, this patent makes no provision for variations in the acoustic path through the fluid due to changes in sonic velocities in the liquid and/or the transducer.

Still other prior art disclosures, of which U.S. Pat. Nos., 3,731,532, 3,738,169, 3,727,454 and 3,727,458 are representative, propose making a third measurement in addition to the sonic upstream and downstream propagation times to determine the velocity of sound within the liquid and to use that measurement to correct for any variation of the liquid sonic velocity. No correction is made for possible changes in acoustic path. In addition, these patents fail to consider the effects of errors resulting from changes in the sonic velocity within the transducer which can produce changes in the acoustic path. Such errors can be especially significant in process control applications because the output accuracy of the flowmeter must be maintained over wide temperature excursions. Moreover the systems referred to above involve an additional one or two ultrasonic transducers with resultant expenditure in circuitry and manufacturing cost which add to the overall complexity of the flowmeter.

Thus notwithstanding all the prior developments in this field, it is apparent that the need still exists for an improved ultrasonic flowmeter having a high degree of accuracy and being particularly adapted for use in an industrial process control environment.

SUMMARY OF THE INVENTION

In a preferred embodiment of the present invention, an improved ultrasonic flowmeter is disclosed having a pair of transducers mounted externally on the same side of a pipe which carries a flowing fluid. The transducers are in turn coupled to a sonic probe which transmits and receives generated acoustic pulses between the transducers through the flowing fluid. The transducers and probes are arranged such that acoustic pulses enter the pipe at an oblique angle to the solid/fluid interface, at which point refraction occurs. The pulses then propagate through the fluid to the opposite pipe wall where they are reflected to the other transducer. The acoustic path within the fluid is uniquely determined for a given set of conditions by the ratio of the velocity of sound in the probe and velocity of sound in the fluid in accordance with Snell's Law. The transducers are excited sequentially to produce acoustic pulses which first travel from the upstream to the downstream transducer and vice-versa. A gated counter measures the respective sonic propagation times between the two transducers.

In accordance with an important aspect of the invention, the flowmeter output is essentially unaffected by sonic velocity variations which alter the acoustic path. The elimination of sonic velocity dependence is achieved by including within the sonic probes means which define a fixed path of known length along which a portion of the generated acoustic pulses propagates. In this manner, a single transmission of an acoustic pulse produces two electrical output signals, one representing the time of flight between the transducers through the flowing fluid and the other representing the time of flight within the sonic probe.

For a given geometry and transducer, the acoustic field of the meter is completely described by the velocity of the flowing fluid and the sonic velocities in the probe and the fluid. Consequently, the two transducer system of the present invention produces three independent sonic propagation time measurements which are sufficient to fully characterize the output response. That is to say, the three time of flight measurements may be combined in accordance with well known physical and mathematical principles to produce an output signal that is proportional to fluid velocity and independent of sound velocity changes both in the fluid and the transmission probe and hence of changes in the path of propagation.

In accordance with another aspect of the invention, the inside surface of the pipe along the region where acoustic pulses enter and exit the pipe is maintained as a smooth bore of uniform cross-section. In the preferred embodiment, the transducers and sonic probes are adapted to be inserted through an opening in the pipe with the end of the probe adjacent the flowing fluid being formed to match the inner contour of the pipe. Alternatively the transducer/probe assembly may be clamped to the exterior of the pipe without disrupting the inner pipe walls.

A further advantage of the present invention derived from the placement of both transducers on the same side of the pipe and transmitting acoustic pulses therebetween by "bouncing" the pulses off the opposite pipe wall is the increase in the overall sensitivity of the meter. This results in effectively doubling the difference between upstream and downstream sonic propagation times within the fluid, while at the same time reducing the effects of radial fluid velocity components.

Other aspects, advantages, and features of the present invention will become apparent from the description of the presently preferred embodiment set forth below.

PREFERRED EMBODIMENT

Drawings

FIG. 2 is an enlarged cross sectional view of the acoustical transducer and sonic probe assembly of the meter of FIG. 1;

FIG. 3 is a schematic representation of the meter of FIG. 1 showing a typical variation in the path of an acoustic ray between the two transducers caused by changes in sonic velocities, and also defining the geometrical relationships for the embodiment;

FIG. 4 is a schematic representation of one of transducer/probe assemblies of the meter of FIG. 1 showing the path of an acoustic ray transmitted orthogonally from the center of the transducer;

DESCRIPTION

Figure 1:
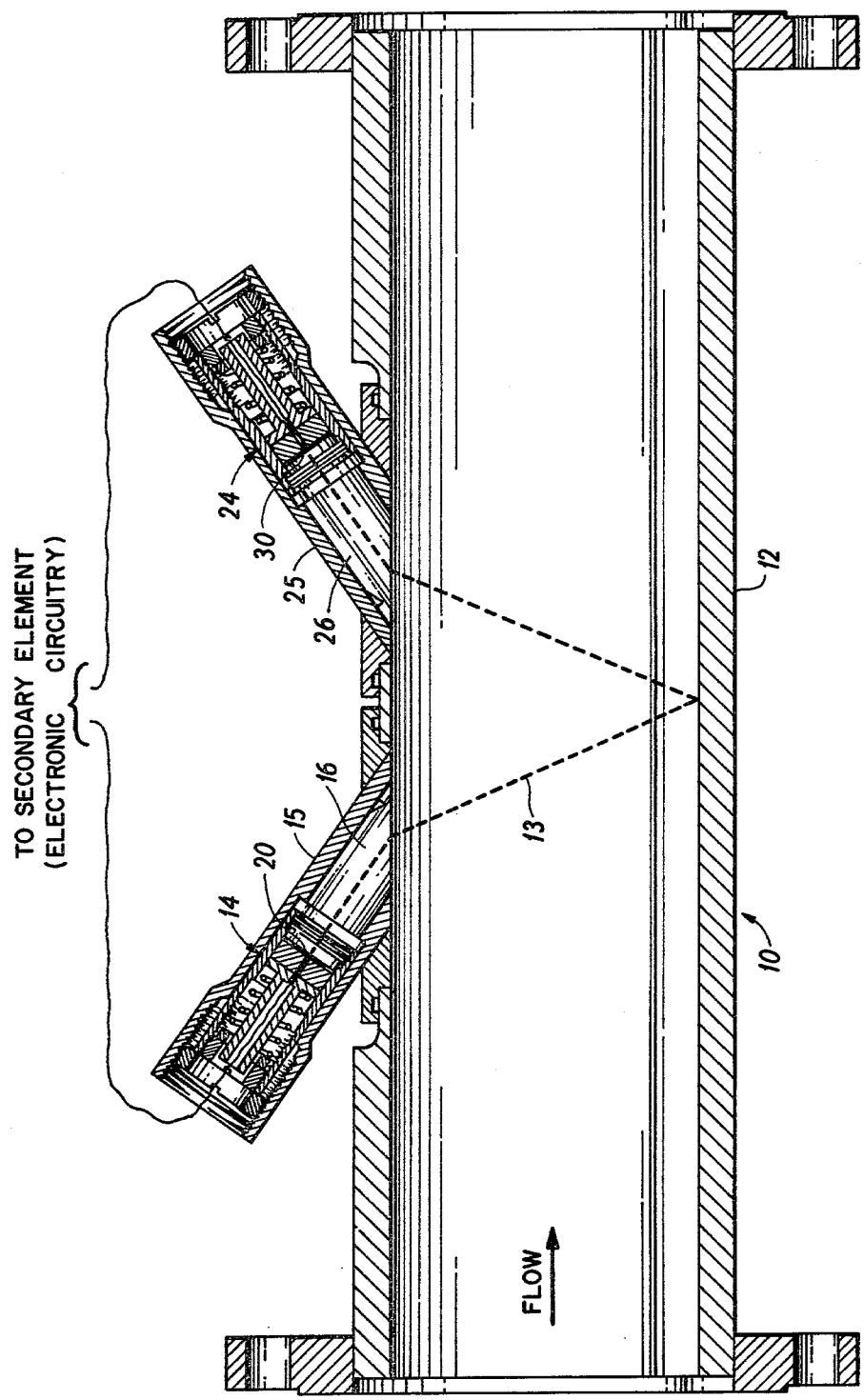
FIG. 1 is a cross sectional view of the primary element of an ultrasonic flowmeter constructed in accordance with the present invention.

Turning now to FIGS. 1 and 2, the primary element of an ultrasonic flowmeter 10 includes a section of pipe 12 and a pair of acoustic transducers shown generally by reference numerals 14, 24 mounted within tubular housings 15, 25 welded to the same side of the pipe at respective upstream and downstream positions. The transducers are arranged such that acoustic pulses generated by each transducer propagate through the fluid to the opposite pipe wall where they are reflected and then received at the other transducer. By this arrangement, the pulses travel diagonally across the fluid along an acoustic path 13; and as is well known, a measure of the difference in travel times of the acoustic pulses between the upstream and downstream transducers is indicative of the fluid velocity.

Each of the transducers 14, 24 are of identical construction and, accordingly, a description of one will be sufficient for both, as is more clearly shown with reference to FIG. 2. The upstream acoustical transducer 14 includes a cylindrical retaining member 14A having a solid sonic probe 16 joined to one end thereof. The retaining member and sonic probe form an integral unit which is adapted to be inserted in the housing 15 and held therein against a shoulder 32. The housing opens out laterally through the pipe walls such that the probe extends up to the interface with the flowing fluid. A gasket 34 which is fitted over the probe seals the process fluid. The end of the probe adjacent the fluid interface is shaped to precisely match the contour of the inner pipe wall, thereby presenting a smooth bore of uniform cross-section in the region where the acoustic pulses enter and exit the pipe. A notch 18 is machined in the probe so as to reflect a portion of the generated acoustic pulses back through the probe as will be more fully explained presently. The probe is formed of stainless steel but may be constructed from any solid material capable of transmitting acoustic pulses.

A piezoelectric crystal 20, adapted to generate acoustic pulses when electrically excited, is positioned within the retaining member 14A and clamped to the end of the probe 16 remote from the fluid. Thus the probe acts as an intermediate transmission medium for directing the generated pulses into the fluid at an appropriate angle for reception at the downstream transducer 24. Of course, when acoustic pulses are received by such piezoelectric crystals, corresponding electrical output signals are produced.

In order to assure maximum electro-acoustic conversion efficiency between the crystal 20, which is polarized to produce shear waves, and its associated probe 16, both contacting surfaces are lapped and then the crystal is clamped against the probe under a pressure of approximately 1000 psi. This high pressure clamp is achieved by a piston 36 which is forcibly urged against the crystal within the retaining member 14A by the combination of a rigid plunger 38, a spring 40, an anti-rotation washer 42, and a transducer load nut 44. Additionally to maximize energy transfer from the probe to the fluid, the polarization plane of the shear wave crystals must be perpendicular to the probe/fluid interface. This is assured by affixing the crystal to the piston with the polarization direction being aligned with a keyway 46 formed on the piston. The piston is then properly positioned relative to the probe by means of the keyway.

The overall transducer assembly 14, consisting of probe, crystal, clamping mechanism, and retaining member, is thus made an integral unit which is inserted into the housing 15 and clamped against the shoulder 32 by a locknut 23. The unitary nature of the transducer assembly facilitates testing and maintenance of the flowmeter even under field conditions. Furthermore mounting the transducer in this manner as opposed to integrally welding or otherwise attaching the probe 16 directly to the pipe improves the ultrasonic signal to noise ratio of the flowmeter because the relatively poor metal to metal contact between the probe and the housing allows minimal transmission of acoustic noise into the pipe wall. Consequently, less acoustic noise arrives at the other transducer through this purely metallic path.

A smooth bore flowmeter having no pockets or protrusions complicates the acoustic design. In order to achieve the required diagonal transmission between the transducers 14, 24, acoustic pulses emanating from either the upstream piezoelectric crystal 20 traveling through the sonic probe 16 or from the corresponding downstream crystal 30 through the sonic probe 26 must obliquely impinge on the probe/fluid interface. Hence the effects of mode conversion and refraction at this interface must be taken into account.

In the embodiment being described, spurious longitudinal waves can be generated within the probe (i.e., mode conversion) in addition to well defined reflected shear waves when the transmitted shear waves impinge on the probe/fluid interface. Such longitudinal waves could inadvertently trigger the output electronics of the flowmeter resulting in significant sonic propagation timing errors. To preclude this problem all sonic energy within the probe remains in the shear mode by choosing an angle of incidence for the transmitted wave such that the reflected longitudinal wave is not generated (i.e., considering the ratio between the longitudinal and shear sonic velocities within the probe, an incident angle at which, according to Snell's Law, the sine of the angle of the undesired reflected wave is >1).

A more difficult problem to contend with involves refraction of the acoustic pulses at the probe/fluid interface. This results from the fact that if either the velocity of sound in the metal probe ($C_M$) or in the fluid ($C_L$) changes, as may occur with changes in temperature, pressure, and/or composition, the angle of refraction will vary producing a concomitant change in the acoustic path length. This is best illustrated in FIG. 3 in which the acoustic path 13 for the initial design conditions has been displaced (shown graphically as path 13A) due to a different ratio of sonic velocity within the two media. The variation in acoustic path directly alters the propagation time of the acoustic pulses between the two crystals 20, 30, and hence is a source of instrument error.

Since such changes in acoustic path occur in a known way, they can be accounted for by resorting to established physical and mathematical principles. Accordingly, an important aspect of this invention is the provision of a two transducer ultrasonic flowmeter capable of producing three independent sonic propagation time measurements which alone are sufficient to precisely characterize the output response of the meter regardless of variations in the acoustic path. The basis for such a three measurement system will be specifically demonstrated immediately below for the far field approximation of the acoustic field (i.e., where the receiving transducer is far enough from the transmitting transducer so that the transmitter may be considered as a point source). However, it is to be emphasized that the three measurement approach is perfectly general and applies equally as well for the near field approximation.

Considering in more detail the physical model represented in FIG. 3, the acoustic field resulting from the excitation of the crystal 20 can be approximated by a plurality of straight rays emanating from the center of the crystal. For simplicity only rays in the plane of FIG. 3 will be considered. For a given meter having fixed geometrical relationships as defined in FIG. 3, the path of any acoustic ray originating from the center of the transmitting crystal is uniquely defined by two parameters, the angle of incidence of the ray in the sonic probe ($\theta_M$) and the angle of refraction of the ray in the fluid ($\theta_L$).

For two media at rest relative to one another, it is possible to relate $\theta_L$ to $\theta_M$ by Snell's Law, $$\frac{\sin \theta_M}{C_M} = \frac{\sin \theta_L}{C_L} \tag{1}$$

However, if one media is moving relative to the other in a direction along their interface, as when fluid is flowing in a conduit, Snell's Law must be modified accordingly, $$\frac{\sin \theta_M}{C_M} = \frac{\sin \theta_L}{C_L (1 \pm \frac{V}{C_L} \sin \theta_L)} \tag{2}$$

where,
V = flow velocity, and the + and − sign represents sonic propagation with and against the flow respectively.

Therefore, for a fixed geometry, the path of any given acoustic ray, i.e., any given $\theta_M$, is uniquely defined as a function of the sonic velocities both in the probe and the fluid, and the fluid flow velocity, that is, $$\theta_L = f_\theta(C_M, C_L, V) \tag{3}$$

Of course, the time for the ray to traverse this path is also a direct function of $C_M$, $C_L$, and V. Since the acoustic pulse for the far field consists of an infinite number of rays all having the same functionality, the transit time ($\tau$) for the pulse to traverse between the two transducers can be similarly expressed as, $$\tau = f_\tau(C_M, C_L, V) \tag{4}$$

Because $C_M$ and $C_L$ are not known a priori, and because in fact they may vary over relatively wide ranges thereby resulting in significant output error if fixed values are assumed, it is apparent from the above expression for $\tau$ that three independent acoustic measurements are required to obtain an exact solution for V in terms of only measured quantities. In the most general case for a fixed geometry flowmeter having a given transducer, the relationship between the various parameters may be mathematically expressed as follows:

$$\tau_1 = f_{\tau 1}(C_M, C_L, V) \tag{5}$$

$$\tau_2 = f_{\tau 2}(C_M, C_L, V) \tag{6}$$

$$\tau_3 = f_{\tau 3}(C_M, C_L, V) \tag{7}$$

Using known mathematical techniques, equations (5), (6), and (7) may be inverted to obtain, $$V = f_V(\tau_1, \tau_2, \tau_3) \tag{8}$$

which demonstrates explicitly that three independent sonic propagation time measurements are necessary and sufficient to specify the flow velocity.

Returning now to the model shown in FIG. 3, the acoustic behavior of the flowmeter can be assumed to follow that of a single acoustic ray which leaves the center of the upstream crystal 20 and arrives at the center of the downstream crystal 30 and vice-versa. Although finite beam effects, which arise from other rays impinging upon the receiving crystal, do exist, output errors resulting from these effects are significantly smaller than those arising from changes in the acoustic path discussed above. For most practical industrial applications, the selection of the "center-to-center" acoustic ray model is a valid premise.

The path between the transducers 14, 24 through the fluid produces two independent acoustic measurements, i.e., the downstream and upstream sonic propagation times ($\tau_d$ and $\tau_u$ respectively). When the upstream crystal 20 is energized, the notch 18 reflects a portion of the transmitted ray back to that crystal over a known path length within the sonic probe 16 (see FIG. 4), thereby providing for a third independent acoustic measurement, i.e., the sonic propagation time within the metallic probe ($\tau_M$).

For the model chosen above, equations (5), (6), and (7) may be expressed as $$\tau_d = \frac{2H}{C_M \cos\theta_M} + \frac{D}{C_L (1 + \frac{V}{C_L} \sin\theta_L) \cos\theta_L} \quad (9)$$

$$\tau_u = \frac{2H}{C_M \cos\theta_M} + \frac{D}{C_L (1 - \frac{V}{C_L} \sin\theta_L) \cos\theta_L} \quad (10)$$

$$\tau_M = \frac{2P}{C_M} \quad (11)$$

where,
- H = distance from inner pipe wall to the center of the piezoelectric crystal
- D = inner pipe diameter
- P = path length in the sonic probe from the crystal to the point of reflection at the notch.

As is readily apparent, equations (9), (10), and (11) contain two additional variables, $\theta_L$ and $\theta_M$, from those which appear in the functional form of these equations, i.e., (5), (6), and (7). However, these two variables are not independent; since, according to the model, the transmitted ray is required to travel from center to center of each of the crystals 20, 30 and must simultaneously obey Snell's Law at the solid/fluid interface (i.e., equation (2)). The distance (L) projected on the pipe axis between the centers of the crystals is given by, $$L = 2H \tan\theta_M + D \tan\theta_L \quad (12)$$

Equations (2) and (9) through (12) represent five independent equations containing five unknowns and hence can be solved by well established methods to yield any one of the unknowns in terms of the three acoustic measurements described above and the geometrical constants. Because of the complexity of these equations, it is impossible to obtain an expression for flow velocity (V) in closed analytic form. It has been found advantageous to use a digital computer in solving these equations to establish the relationship between V and the three sonic measurements ($\tau_d$, $\tau_u$, $\tau_M$). Such computer techniques are well known to those skilled in the art and thus need not be explored in detail here.

This calculation may be performed "on-line" if the flowmeter incorporates a data processor of sufficient capability. However, from a commercial standpoint it is preferable either to construct "off-line" a table of "V" values corresponding to measured sonic propagation times for on-line look-up, or to approximate offline a solution for V by some mathematical function of $\tau_d$, $\tau_u$, and $\tau_M$ for on-line computation, or to provide some combination of these off-line techniques. In this embodiment the three measured variables are inputs to an approximated off-line solution for the flow velocity involving a power series expansion in $\tau_M/\tau_L$ which is given by, $$V = A \frac{\tau_u - \tau_d}{\tau_M \tau_L} [1 - \alpha(S - S_o) + \beta(S - S_o)^2 + \ldots] \quad (13)$$

where,
$\tau_L = \tau_u + \tau_d - B\tau_M$
A and B = constants dependent on the geometry of the probe
$S = \tau_M/\tau_L$
$S_o$ = the value of $\tau_M/\tau_L$ experienced with the design fluid at the design temperature
$\alpha$ and $\beta$ = constants dependent on the pipe size and/or geometry The number of terms kept in the above expansion is determined by the required accuracy of the flowmeter. As seen above, at design reference conditions V is given by a simple function of the three acoustic measurements $\tau_u$, $\tau_d$, and $\tau_M$.

Figure 5:
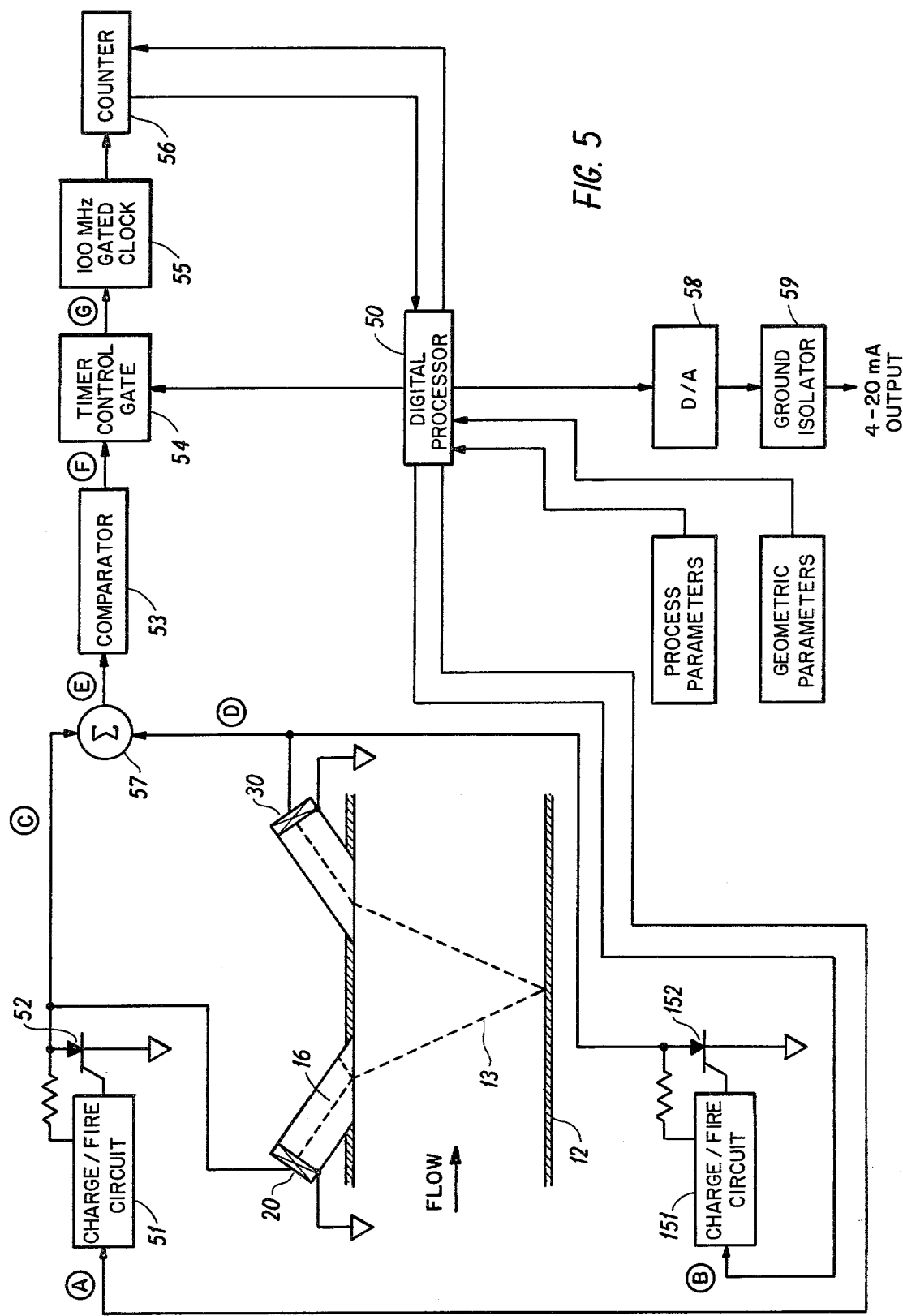
FIG. 5 is a block diagram showing the electronic circuitry for producing an output flow signal for the embodiment.

Returning now to the operation of the flowmeter 10, FIG. 5 shows the details of the electronic circuitry which drives the primary element and processes the measurement signals received therefrom so as to produce an output flow signal. The block diagram of FIG. 5 taken together with the wave forms of FIG. 6, whose amplitude and time base are shown out of scale for the sake of presetting details of the wave forms, will serve to provide better understanding of the operation of the device. The wave forms are identified at circuit points in FIG. 5 by corresponding letter designators (i.e., A,B,C, etc.).

In general, the circuitry must perform the functions of (1) exciting the transducers; (2) measuring the sonic propagation times; (3) reading the values of process and/or geometric parameters; (4) performing a variety of standard arithmetic operations; and (5) generating an output control signal suitable for process control applications (e.g., 4–20 ma). Although the art is replete with analog techniques for performing these functions, as evidenced by U.S. Pat. Nos. 3,727,454, 3,731,532, and 3,738,169 referenced above, it has been found advantageous to use digital processing techniques for the required signal handling. Specifically for this embodiment a microprocessor system of the type commercially available from INTEL under Model No. 8085 is utilized. It is well within the skill of the ordinary man in the art to program such microprocessor systems to carry out the steps outlined above. Moreover, the use of a programmable digital processor has been described for use with an ultrasonic flowmeter of the general type disclosed herein in U.S. Pat. No. 3,918,304 issued to Abruzzo et al, to which reference may be made.

In operation, a digital processor 50 delivers a 0.5 millisecond charging pulse 60 (wavefom A) to a charge/fire circuit 51. The charge/fire circuit slowly charges the upstream crystal 20 to approximately 40 volts. An SCR 52 is then gated by the charge/fire circuit causing the crystal to be discharged through the SCR in 10 nanoseconds or less. This rapid discharge forces the crystal to generate an acoustic pulse and also produces a negative going spike 61 at the input of a comparator 53 (waveform E). This in turn enables a timer control gate 54 so that a counter 56 which is driven by a 100 MHz clock 55 gated from the timer control gate begins to count.

Figure 6:
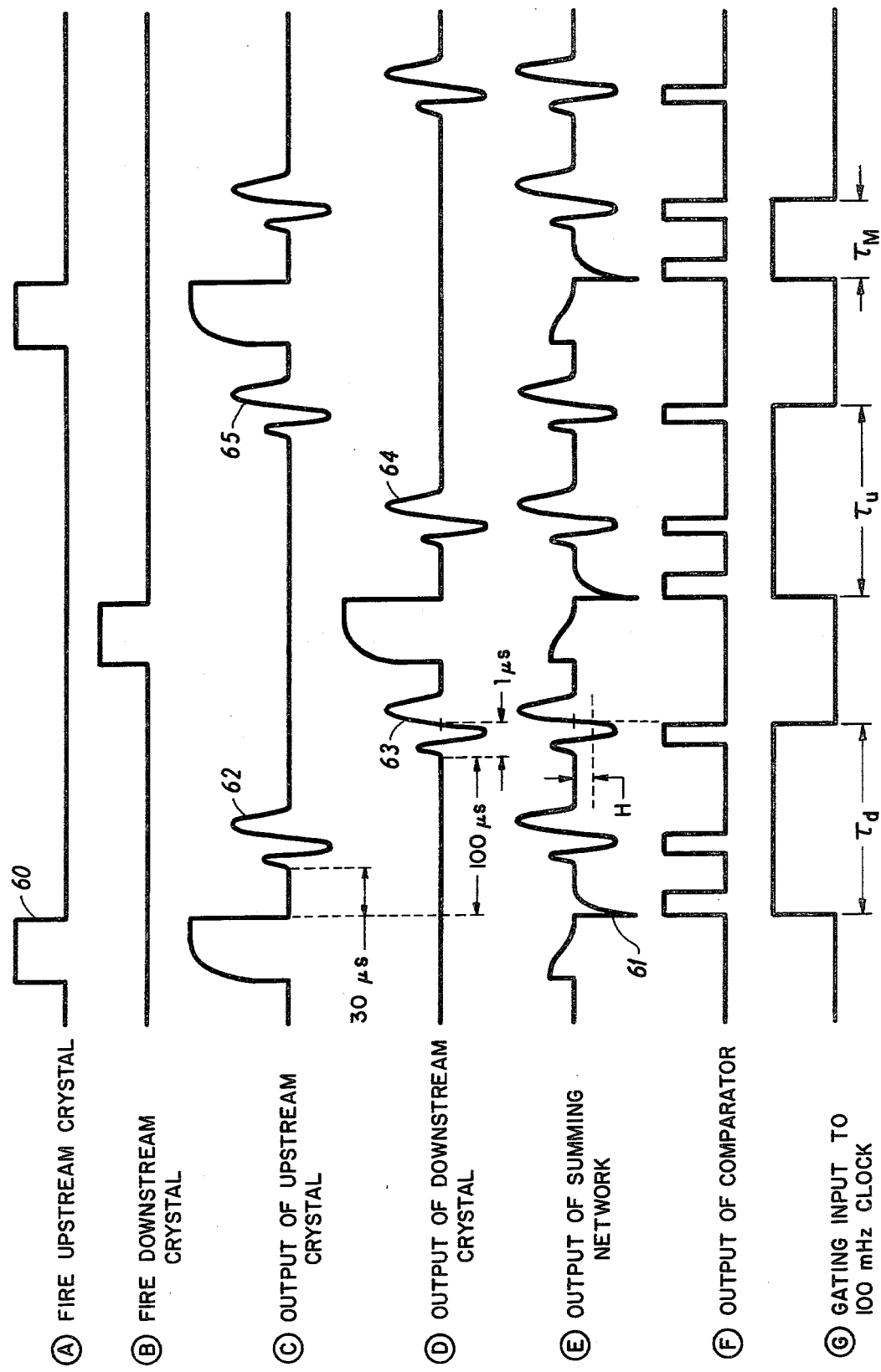
FIG. 6 is a timing diagram for the embodiment.

As shown in waveform C of FIG. 6, a typical acoustic echo pulse 62 is received back at the upstream crystal 20, thirty microseconds after the discharge of the crystal. Because of the geometry of the sonic probe 16, this event will always occur in less than 50 microseconds from the discharge of the crystal. Thus the timer control gate 54 on command from the digital processor 50 ignores any change in state of the comparator 53 that occurs within the 50 microsecond period after the upstream crystal discharge.

The counter 56 continues to count until an acoustic pulse is received at the downstream crystal 30 as depicted by numeral 63 on waveform D. As is also shown in waveforms E and F, the comparator 53 will only be driven to its high state by pulses whose amplitude exceed a predetermined threshold level "H", thereby preventing the comparator from being set by spurious pulses resulting from reflections within the pipe 12 and the probe 16. On the other hand, once the comparator is set a pulse must cross zero in order to clear the comparator. Timing to the zero crossing is more accurate than timing to a level on a cycle of the pulse because signal amplitude fluctuations may occur.

Since the pulse 63 is received by the downstream crystal 30 more than 50 microseconds after the firing of the upstream crystal 20, both the comparator 53 and the timer control gate 54 are cleared, thereby disabling the counter 56. The number of counts recorded by the counter is then fed to the digital processor 50 for storage. The number of counts represents the time of sonic propagation from the upstream wave generator to the downstream generator ($\tau_d$).

After this cycle is completed, the digital processor 50 initiates in a similar manner a charge/firing process for the downstream crystal 30, i.e., a 0.5 millisec pulse is fed to a downstream charge/fire circuit 151 which charges and then suddenly causes discharge of the crystal 30 through an associated SCR 152, thereby forcing the crystal to generate an acoustic pulse. Once again, an echo pulse 64 (waveform D) received back at the downstream crystal is disregarded by the timer control gate 54 because it occurs within 50 microseconds after the discharge of the downstream crystal. When an acoustic pulse 65 (waveform C) is finally received at the upstream crystal 20, the contents of the counter 56 are read by the digital processor to provide a measurement of the upstream sonic propagation time ($\tau_u$).

As shown in FIG. 5 and in FIG. 6 at waveform E, the outputs of both crystals are applied to a summing network 57 and then fed to the comparator 53. Although the combination of the waveforms somewhat increases the complexity of discerning the appropriate pulses for enabling and disabling the timer control gate 54, a single comparator eliminates the need for precise matching of the electrical propagation paths that would be required if multiple comparators were used. Different comparators and their associated timer control circuitry have unequal total delay times and the difference in total delay times can be in the tenths of a nanosecond range. Since the difference in sonic propagation times (i.e., $\tau_u - \tau_d$) used in the flow calculations can be also in the nanosecond range, it can be seen that the use of multiple comparators would introduce appreciable error unless precise matching were employed.

As the difference in sonic propagation times (i.e., $\tau_u - \tau_d$) must be precisely known, the upstream/downstream measurement cycle is repeated and averaged over a fixed number of times (e.g., 400 pairs of measurements) prior to making a measurement of sonic propagation time in the metal probe ($\tau_M$). After these fixed pairs of measurement are made, the digital processor 50 will enable the timer control gate 54 to respond to a signal which follows the discharge of the upstream crystal 20 by less than 50 microseconds, while pulses occuring more than 50 microseconds after discharge (e.g., the pulse received at the downstream crystal 30) are ignored.

Because digital measurements involve a resolution of one clock cycle (i.e., 10 nanoseconds in the described embodiment) and because as mentioned the difference in sonic propagation times can also be in the nanosecond range, it has been found desirable to utilize time interval averaging to further enhance the resolution and accuracy of the flowmeter. Such techniques, which involve statistical averaging over many repetititive measurement cycles, are well known in the art. Reference is made to Hewlett/Packard Application Notes 162-1 for further discussion of this subject matter.

After the various measurements cycles, the digital processor 50 has thus stored therein a measurement of the sonic upstream time of flight, the sonic downstream time of flight and the sonic time of flight within the probe. Additionally various process parameters, such as zero and span together with the geometric parameters for the meter (i.e., height and position of the transducers, pipe diameter, etc.) are supplied as inputs to the processor. Thereafter, by simple straight forward arithmetic operations, the various parameters and measured values are adapted to be combined (as exemplified by equation (13)) by the processor to produce a digital flow signal proportional to the velocity. This digital value is converted into a corresponding analog signal by a digital to analog converter 58 to produce an output signal compatable with industrial control requirements, i.e., 4 to 20 ma. The output signal is then fed to a ground isolator 59 which may take the form of a pulse transformer to assure that the ground of the associated process controller is not tied to the ground of the flowmeter.

The placement of the two transducers on the same side of the pipe has the desired effect of substantially eliminating the sensitivity of the meter to radial fluid velocity components in the plane of FIG. 3, while at the same time doubling its sensitivity to axial flow. Output errors resulting from radial flow can be significant, particularly when the transducers are positioned near elbows or other similar areas of flow distrubance. When a single measurement cycle is defined by transmitting acoustic pulses from one transducer across to the opposite pipe wall and back across the fluid to the other transducer as in the present flowmeter, it is evident that for a constant radial flow pattern along the axial direction summing these two travel paths cancels the vector components of the radial flow. This "bounce" technique has the added advantage of doubling the propagation times of the pulses within the fluid and more importantly of doubling the difference in sonic propagation times. Since the difference in sonic propagation time is directly proportional to the pipe diameter, a "bounce" flowmeter of given diameter has twice the sensitivity to axial flow as a comparable size meter in which the transducers are placed on opposite sides of the pipe.

ALTERNATE EMBODIMENTS

Figure 7:
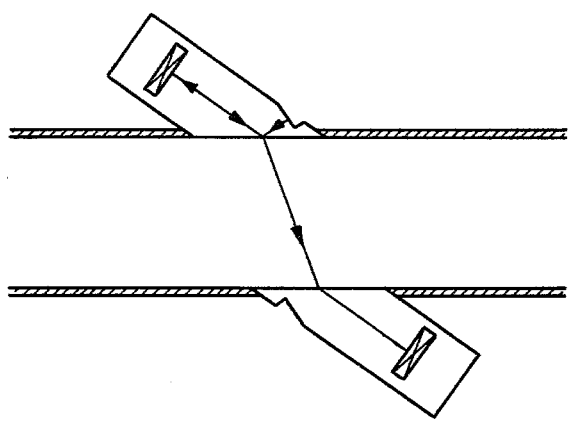
FIG. 7 is a schematic representation of an alternate embodiment showing the path of a transmitted acoustic ray in which the transducers are located on opposite sides of the pipe.

Although the invention has been described in detail with respect to a specific illustrative example involving a refractive metering system wherein the output is unaffected by variations in acoustic path, the inventive features disclosed above apply equally as well to normal injection (i.e., non-refractive) meters to obtain a measure of flow velocity independent of changes in the sonic velocities in the fluid and the sonic probe. Additional modifications may be possible as exemplified by FIG. 7 wherein the transducers are shown in schematic form mounted on diagonally opposite pipe walls. This configuration may be preferrable in certain fluid applications where the flow is undisturbed for several pipe diameters. Nonetheless, the ultrasonic measurement and signal processing discussed above apply to this transducer arrangement.

Figure 8:
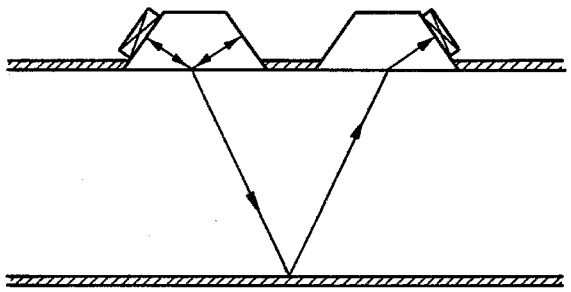
FIG. 8 is a schematic representation of another embodiment having a different transducer and probe assembly and showing the path of a transmitted acoustic ray.
Figure 9:
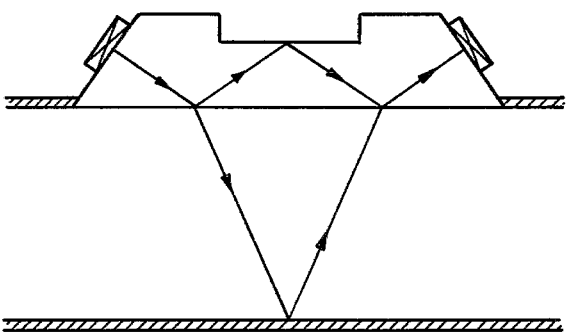
FIG. 9 is a schematic representation of still another embodiment showing the path of a transmitted acoustic ray in which both transducers are housed in a unitary structure.

FIGS. 8 and 9 show other possible modifications which relate to the structure housing the transducers and the techniques for deriving a measurement of the sonic propagation time within that structure. In FIG. 8, the piezoelectric crystal is schematically depicted as being bonded to the exterior of a truncated pyramidal structure, the acoustic path within the structure of known length being defined without the use of reflection notches or the like. FIG. 9 shows a unitary housing for both transducers in which the acoustic path for measuring sonic propagation times in the housing is established between the two transducers as opposed to being derived from a reflection back to the transmitting transducer as in previous examples.

Additionally all of the preceding examples have shown transducer housings that are welded or otherwise integrally joined to the pipe. However, the processing/measurement techniques of the present invention can be implemented equally as well by transducer housing/sonic probe assemblies that are clamped in position to the exterior of a pipe, thereby simplifying installation and maintenance within a process field.

Various other modified arrangements will become apparent to those of skill in the art from the above detailed description. Accordingly, the true scope of the invention is not to be limited by these specific illustrative examples.

What is claimed is:

1. An ultrasonic flowmeter for measuring the velocity of a fluid flowing within a conduit comprising:
    first and second transducer means secured to said conduit at longitudinally spaced positions for transmitting and receiving acoustic pulses;
    said transducer means including respective sonic transmission means arranged to direct acoustic pulses from one of said transducer means to the other through said fluid along a sonic path which includes said transmission means and said fluid;
    signal generating means coupled to said transducer means for producing a first transmission of acoustic pulses from said first to said second transducer means and then a second transmission of acoustic pulses from said second to said first transducer means along said sonic path;
    means defining within said sonic transmission means at least one acoustic path of known length along which a portion of said first transmission propagates;
    said transducer means producing output signals in response to received acoustic pulses corresponding to sonic propagation times along said sonic path between said first and second transducer means and vice-versa and along said acoustic path within said sonic transmission means;
    means operable with said signal generating means for measuring said sonic propagation times;
    said measured sonic propagation times adapted to be combined in accordance with known physical principles to obtain a measure of flow velocity independent of changes in the sonic velocities in said fluid and in said sonic transmission means.

2. Apparatus as claimed in claim 1 wherein said transducer means are located on opposite sides of said conduit.

3. Apparatus as claimed in claim 1 wherein said transducer means are located on the same side of said conduit.

4. Apparatus as claimed in claim 3 wherein acoustic pulses transmitted by said first transducer means propagate through said fluid to the opposite wall of said conduit at which point they are reflected so as to be received at said second transducer, thereby substantially eliminating the sensitivity of said flowmeter to radial velocity components of the flowing fluid, while at the same time doubling its sensitivity to axial flow.

5. Apparatus as claimed in claim 1 wherein the inner surface of said conduit forms a smooth bore of uniform cross-section at least at the interface between said flowing fluid and said sonic transmission means where acoustic pulses enter and exit said conduit;
    said transmission means arranged to direct acoustic pulses along a refracted path which varies depending upon the ratio of the sonic velocities in said transmission means and said fluid;
    said measure of flow velocity being independent of changes in said refracted path.

6. Apparatus as claimed in claim 5 including two tubular housings welded to said conduit for receiving respective transducer means, said housings opening out laterally through the inner surfaces of said conduit.

7. Apparatus as claimed in claim 6 wherein each of said transducer means comprises:
    a cylindrical metal probe mounted in said housing such that one end of said probe interfaces with said flowing fluid;
    ultrasonic generating means adapted when electrically energized to produce acoustic pulses clamped to the other end of said probe.

8. Apparatus as claimed in claim 7 wherein said ultrasonic generating means comprises a piezoelectric crystal polarized to produce ultrasonic shear waves, the contacting surfaces between said crystal and said probe being lapped, said probe and said crystal being held in position under high pressure to maximize the electroacoustical conversion efficiency therebetween.

9. Apparatus as claimed in claim 8 including a rigid, threaded member mounting said probe within said housing and arranged to apply high forces on said crystal.

10. Apparatus as claimed in claim 9 including spring means coupled to said threaded member for maintaining a relatively constant force on said crystal over wide temperature ranges.

11. Apparatus as claimed in claim 7 wherein said one end of said probe is shaped to match the contour of the inner wall of said conduit.

12. Apparatus as claimed in claim 7 wherein said probe includes a notch adjacent said one end for reflecting a portion of said first transmission back to said ultrasonic generating means.

13. Apparatus as claimed in claim 5 wherein said transducer means are adapted to generate acoustic pulses in the shear mode when electrically energized.

14. Apparatus as claimed in claim 13 wherein said sonic transmission means are arranged to direct said generated acoustic pulses at an angle of incidence to the interface with said fluid such that all acoustic energy within said sonic transmission means remains in the shear mode.

15. An ultrasonic flowmeter for measuring the velocity of a fluid flowing in a conduit comprising:
first and second electroacoustical transducer means secured to the same side of said conduit at positions longitudinally spaced, the cross-sectional area of said conduit being maintained uniform in the region where said transducer means are secured;
said transducer means including respective piezoelectric crystals for producing acoustic pulses when electrically energized;
said transducer means further including respective sonic transmission means coupled to said crystals and arranged to direct acoustic pulses from one of said transducer means to the other of said transducer means along a refracted path having a variable length that is dependent upon the ratio of the sonic velocities in said transmission means and said fluid;
signal generating means coupled to said piezoelectric crystals for producing a first transmission of acoustic pulses from said first to said second transducer means and then a second transmission of acoustic pulses from said second to said first transducer means along said refracted path;
means defining within said sonic transmission means a fixed path of known length along which a portion of said first transmission propagates said fixed path located solely in said sonic transmissions means of said first transducer;
said first transducer means producing two output signals in response to received acoustic pulses, one corresponding to the sonic propagation time between said second and said first transducer means, the other corresponding to the sonic propagation time along said fixed path;
said second transducer means producing an output signal in response to a received acoustic pulse corresponding to the sonic propagation time between said first and said second transducer means;
electronic circuit means operable with said signal generating means for measuring each of said sonic propagation times;
each of said measured sonic propagation times adapted to be combined in accordance with known physical principles to obtain a measure of fluid velocity independent of changes in said refracted path and changes in the sonic velocities in said fluid and in said sonic transmission means.

16. Apparatus as claimed in claim 15 wherein said fixed path is defined by reflective means which cause said portion of said first transmission to return to said crystal of said first transducer means.

17. Apparatus as claimed in claim 15 wherein said fixed path is defined by reflective means which cause said portion of said first transmission to arrive at said crystal of said second transducer means.

18. Apparatus as claimed in claim 15 wherein said electronic circuit means includes:
summing means coupled to said transducer means for combining said output signals on a single output line;
a comparator receiving said combined output signals and producing trigger signals only when an input signal of predetermined polarity is received that exceeds a predetermined threshold level and for as long as said input signal maintains said polarity.

19. Apparatus as claimed in claim 18 wherein said electronic circuit means further includes:
a counter;
timing control circuit means receiving said trigger signals;
signal processor means producing gating signals to said timing control circuit means for selectively enabling and disabling said counter to provide a measurement of the sonic propagation times between said first and second transducer means and vice-versa and along said fixed path.

20. Apparatus as claimed in claim 19 wherein said measured sonic propagation times are stored in said signal processor means, said signal processor means also including stored data corresponding to geometric and process parameters, said processor means combining said measured times with said parameters to produce an output signal proportional to fluid velocity independent of changes in said refracted path and of changes in the sonic velocities in said fluid and in said sonic transmission means.

21. A method of measuring the velocity of a fluid flowing within a conduit which comprises:
generating acoustic pulses at respective first and second transducer means for propagation back and forth therebetween through said fluid;
directing a first transmission of acoustic pulses by sonic transmission means from said first to said second transducer means and a second transmission from said second to said first transducer means, said transmissions being directed between said transducer means along a sonic path including said sonic transmission means and said fluid;
guiding a portion of said first transmission along at least one acoustic path of known length within said sonic transmission means;
producing by said first and second transducer means in response to received acoustic pulses output signals corresponding to sonic propagation times along said sonic path between said first and said second transducer means and vice versa and along said acoustic path within said sonic transmission means;
combining said output signals corresponding to said sonic propagation times in accordance with known physical principles to obtain a measure of flow velocity independent of changes in the sonic velocities in said fluid and in said sonic transmission means.

22. The method as claimed in claim 21 wherein the inner surface of said conduit forms a smooth bore of uniform cross-section at least at the interface between said flowing fluid and said sonic transmission means where acoustic pulses enter and exit said conduit;
said transmission means arranged to direct acoustic pulses along a refracted path which varies depending upon the ratio of the sonic velocities in said transmission means and said fluid;
said measure of flow velocity being independent of changes in said refracted path.

23. The method as claimed in claim 21 wherein said transducer means are located on the same side of said conduit.

24. The method as claimed in claim 23 including the steps of directing said first transmission of acoustic pulses through said fluid to the opposite wall of said conduit and reflecting said pulses from said opposite wall for reception at said second transducer, whereby the sensitivity of the measured velocity to radial components of the flowing fluid is substantially eliminated while at the same time the sensitivity to axial flow components is doubled.

25. The method as claimed in claim 21 wherein said transducer means are located on opposite sides of said conduit.

26. The method as claimed in claim 21 wherein said transducer means comprises a metal probe and a piezoelectric crystal adapted to produce ultrasonic shear waves clamped to said probe.

27. The method as claimed in claim 26 including the steps of mounting said probe in a housing and applying high forces on said crystal within said housing.

28. An ultrasonic flowmeter for measuring the velocity of a fluid flowing within a conduit comprising:
   first and second transducer means secured to said conduit at longitudinally spaced positions for transmitting and receiving acoustic pulses;
   said transducer means including respective sonic transmission means arranged to direct acoustic pulses from one of said transducer means to the other through said fluid along a refracted path which varies depending upon the ratio of the sonic velocities in said transmission means and said fluid;
   signal generating means coupled to said transducer means for producing a first transmission of acoustic pulses from said first to said second transducer means and then a second transmission of acoustic pulses from said second to said first transducer means along said refracted path;
   means defining within said sonic transmission means a fixed path of known length along which a portion of said first transmission propagates;
   said transducer means producing output signals in response to received acoustic pulses corresponding to sonic propagation times along said refracted path between said first and second transducer means and vice-versa and along said fixed path;
   means operable with said signal generating means for measuring said sonic propagation times;
   said measured sonic propagation times adapted to be combined in accordance with known physical principles to obtain a measure of fluid velocity independent of changes in said refracted path and of changes in the sonic velocities in said fluid and in said sonic transmission means.

29. Apparatus as claimed in claim 28 wherein the inner surfaces of said conduit present a smooth bore of uniform cross-section at least in the region where acoustic pulses enter and exit said conduit.

30. Apparatus as claimed in claim 28 wherein said transducer means are located on the same side of said conduit.

31. Apparatus as claimed in claim 28 wherein said transducer means are located on opposite sides of said conduit.

32. Apparatus as claimed in claim 28 including two tubular housings welded to said conduit for receiving respective transducer means, said housings opening out laterally through the inner surfaces of said conduit.

33. Apparatus as claimed in claim 32 wherein each of said transducer means comprises:
   a cylindrical metal probe mounted in said housing such that one end of said probe interfaces with said flowing fluid;
   ultrasonic generating means adapted when electrically energized to produce acoustic pulses clamped to the other end of said probe.

* * * * *